Patented Feb. 28, 1950

2,499,229

UNITED STATES PATENT OFFICE 2,499,229

REFRACTORY INSULATING BRICK AND METHOD OF MANUFACTURE

Adam S. Rankine, Jr., Martinsville, N. J., assignor to Johns-Manville Corporation, New York, N. Y., a corporation of New York No Drawing. Application October 4, 1947, Serial No. 778,029

10 Claims. (Cl. 106—41)

This invention relates to light weight refractory insulating brick, and particularly to a high temperature insulating brick of substantial volume stability and strength, and method of making the same.

Many different molding compositions and methods have been heretofore proposed for the manufacture of light weight refractory insulating brick. Conventional methods generally involve admixture of an organic burn-out material with a plastic clay and grog mix, molding the mixture to shape and drying, and burning out the organic filler during firing of the batch brick to develop porosity. Difficulty has been encountered in attempts to develop refractory insulating brick of such low density as to adapt them for efficient heat insulation, by reason of the manufacturing problems encountered in developing the necessary internal porosity without serious loss of compressive strength and volumetric stability. The insulating bricks which are produced by conventional methods tend to develop an undesirable degree of contraction and spalling, as well as loss of strength, when employed as furnace linings exposed to temperatures in the neighborhood of 2600° F.

A primary object of the present invention is to provide a refractory insulating brick of light weight which resists spalling and exhibits volume stability at temperatures in the neighborhood of 2600° F.

Another object is to provide a volume stable, light weight refractory insulating brick having such compressive strength and resistance to thermal shock as to adapt it for use as linings for high temperature furnaces.

A further object is to provide an economical and efficient method of making high temperature insulation brick of high quality.

With the above objects in view the invention consists in the improved refractory insulating brick and method of manufacture which are hereinafter described and more particularly defined by the accompanying claims.

The present invention is based upon the discovery that a refractory insulating brick of light weight, good transverse and compressive strength, and also exceptional volumetric stability at high temperature, can be produced by incorporating substantial amounts of kyanite and pyrophyllite in the relative proportions of .5–1:1 in a plastic batch containing burn-out material, grog and 30–60% by weight of clay, and molding, drying and firing the bricks as hereinafter described.

Insulating fire bricks suitable for service up to 2600° F. are made by the present invention which exhibit relatively low processing shrinkage and develop minimum process cracks, warping, and deformation during manufacture. The formula for producing these brick includes a comparatively low bonding clay content, thereby minimizing the processing shrinkage, which is usually proportional to the amount of raw clay employed in the molding batch, with its attendant cracking and deformation. It has been heretofore proposed to reduce the clay content of the batch by substituting for part of the clay inert material such as calcined clay, grog or other non-plastic minerals. However, most of these inert materials impart undesirable characteristics to the resulting brick such as low strength, high reheat shrinkage, or poor spall resistance. The desirable characteristics of the present brick are imparted by incorporating therein both kyanite and pyrophyllite.

Mixtures which have proven effective for producing light weight insulating refractory bricks having exceptional volumetric stability at temperatures of 2600° F. or lower, and which resist spalling over long periods of use at such temperatures, are the following:

| | Formula I | Formula II |
|---|---|---|
| | Per cent | Per cent |
| Sawdust | 15–25 | 15–25 |
| Grog | 10–30 | 10–30 |
| Kaolin | 30–60 | 15–50 |
| Ball Clay | | 10–25 |
| Kyanite | 5–20 | 5–20 |
| Pyrophyllite | 5–20 | 5–20 |

The sawdust preferably consists of white and yellow pine ground to a size of substantially —14 mesh. A preferred kaolin is one of uniform fine grain structure and high purity, having a Pyrometric Cone Equivalent (PCE) of at least cone 33. A good grade of Georgia kaolin or washed Florida kaolin meets the preferred specifications. The kyanite should be raw kyanite ground to a size of substantially —35 mesh. The pyrophyllite may be any commercial grade ground to pass through standard 140 mesh screen. The grog is preferably made of burned brick of the same kind as that produced by the present process.

An example of a suitable molding batch is one comprising 20% sawdust, 20.5% grog, 39.1% kaolin, 10.2% pyrophyllite and 10.2% kyanite. The grog is waste from the fired brick of the indicated composition ground to size. All of the dry ingredients should be sized to pass a 35 mesh screen, and the pyrophyllite should be so finely divided as to all pass a 140 mesh screen. The batch may be prepared for molding by dry mixing the kaolin, sawdust, grog, kyanite and pyrophyllite, and further mixing the pulverulent dry material with water in the proportions of about 2 lbs. of dry batch with approximately 1 lb. of water. The plastic mixture which is thus formed is loaded into molds of convenient size. After the molding operation, the bricks should be subjected to a slow drying operation at a temperature of about 200° F.–250° F., and the dry bricks then fired in an oxidizing atmosphere to a final temperature of 2450°–2600° F.

Fired bricks which were produced in accordance with the above formula had the following properties: Density 48 lbs./cu. ft., linear shrinkage during drying at 250° F. 3.3%, linear shrinkage during firing at 2550° F. (cone 15) 1.0%, linear shrinkage during refiring at 2600° F. for 24 hours 0.5%, transverse strength or modulus of rupture 115 lbs./sq. in., compressive strength 175 lbs./sq. in.

Another suitable batch formula in which ball clay is substituted for part of the kaolin comprises 17.6% ball clay, 19% sawdust, 20.7% grog, 27.1% kaolin, 5.2% kyanite and 10.4% pyrophyllite. Fired bricks which were produced by molding a batch of this composition had the following properties: Density 53 lbs./cu. ft., reheat linear shrinkage after 24 hours at 2600° F. 1.0%, transverse strength 130 lbs./sq. in., compressive strength 200 lbs./sq. in.

The improvements in processing behavior and physical properties of the present brick result from the use of both pyrophyllite and kyanite in the molding batch. The presence of pyrophyllite in the proportions indicated greatly increases the strength of the resulting brick, thereby permitting use of a lower proportion of clay in the molding batch. The reduction of the clay content of the molding batch results in lower processing shrinkage, with less cracking and deformation during processing. Kyanite in the proportions indicated reduces processing shrinkage in even greater degree than effected by the pyrophyllite present, for the reason that kyanite expands appreciably when heated above 2350° F. Kyanite in the proportions indicated also reduces the shrinkage of the product on reheat firing. The high alumina content of the kyanite substantially counterbalances the low alumina content of the pyrophyllite, so that equal parts of kyanite and pyrophyllite in the fired brick develop approximately the same chemical composition as in fired kaolin. However, fired kaolin cannot be used as a substitute for the pyrophyllite and kyanite because to replace the kyanite and pyrophyllite with raw kaolin in the molding batch would result in development of high processing shrinkage, much higher reheat shrinkage and a product of less strength. If a calcined clay or kaolin were used as a grog with a raw clay binder, the total amount of calcined clay which would be required to develop low processing shrinkage would result in a very weak product.

An important feature of the present invention is the use of complimentary amounts of both kyanite and pyrophyllite in the molding batch. The high alumina content of the kyanite makes up for the low alumina content of the pyrophyllite, with the result that the fired brick exhibits marked dimensional stability and freedom from spalling under exposure to high temperatures. The pyrophyllite imparts substantial strength to the product and overcomes any weakening effect of the kyanite, and the presence of both of these minerals permits the use of a high percentage of non-plastic minerals in the molding batch. The presence of both minerals in the percentages indicated in the foregoing formulas produces a product which develops minimum tendency to cracking and deformation during drying and firing, and which possesses very much greater strength, minimum reheat shrinkage or expansion, and high spall resistance. As compared to a brick of similar composition containing no kyanite and pyrophyllite, the bricks of the present invention exhibit very much lower linear shrinkage during drying at the 200–250° F. temperature range, and also exhibit only a small fraction of the linear shrinkage during firing at temperatures increasing to 2550° F. Such bricks furthermore exhibit very much greater volume stability and low linear shrinkage during refiring at 2600° F. over a 24 hour period.

The invention which has thus been described by detailed example is not limited as to such details and it is to be understood that variations, changes and modifications are contemplated within the scope of the invention as defined by the following claims.

What I claim is:

1. A moldable heat hardenable matrix mixture adapted for making light weight refractory insulating brick having a density of 48–53 lbs./cu. ft. and substantial volumetric stability up to 2600° F. consisting essentially of finely divided bonding clay, kyanite and pyrophyllite in approximately the dry weight proportions of about ⅔ parts clay and about ⅙ parts each of kyanite and pyrophyllite.

2. A refractory insulating brick having a density not substantially exceeding 55 lbs./cu. ft. and substantial volumetric stability up to 2600° F., having a matrix consisting essentially of the fired reaction product of finely divided clay bonding agent, kyanite and pyrophyllite in approximate dry weight proportions of 40–45 parts of clay and 16–20 parts kyanite and pyrophyllite in the dry weight proportions of .5–1:1.

3. A refractory insulating brick having a density of approximately 50 lbs./cu. ft. and having a PCE of at least cone 30 having a matrix consisting essentially of the burned reaction product of approximately two parts finely grained kaolin and ½ parts each of kyanite and pyrophyllite, said brick having a reheat linear shrinkage of not to exceed about 1% when fired for several hours at a temperature of 2600° F.

4. A refractory insulating brick as defined in claim 1, having a transverse strength of at least 115 lbs./sq. in. and a crushing strength of at least 175 lbs./sq. in.

5. A light weight refractory insulating brick consisting essentialy of the oxidized and fired reaction product of finely divided refractory bonding clay, finely divided kyanite, finely divided pyrophyllite, water, 10–30% dry weight of grog and 15–25% finely divided organic burnout material, the reactive components of said batch being proportioned in the ratio of about 25–60% dry weight of the clay to 5–20% each of the kyanite and pyrophyllite.

6. In the manufacture of refractory brick the steps comprising, forming a plastic brick molding batch comprising 5–20% dry weight of finely divided raw kyanite, 5–20% finely divided pyrophyllite, 30–60% dry weight of finely divided refractory bonding clay and water, incorporating in said batch 15-25% dry weight of sawdust and 10-30% of grog, molding to brick form and firing to burn out the sawdust.

7. In the manufacture of light weight insulating brick the steps comprising, forming a plastic brick molding batch comprising 25-60% dry weight of finely divided refractory bonding clay, 5-20% finely divided kyanite, 5-20% finely divided pyrophyllite, water, 10-30% grog and 15-25% organic burn out material, and proportioning the kyanite and pyrophyllite in the dry weight proportions of .5-1:1.

8. A process of manufacturing light weight refractory brick which comprises, forming a plastic mixture including 30-60% finely divided kaolin, 5-20% each of finely divided kyanite and pyrophyllite, 15-25% of finely divided organic burn out material, 10-30% of grog, and water, filling a mold with the plastic mixture, drying the molding shape, and firing the dry brick to burn out the combustible material and develop a ceramic bond.

9. In the manufacture of porous insulating brick the steps comprising, forming a plastic batch containing water and a uniformly distributed mixture of 10-30% by weight of finely ground grog, 25-60% finely divided refractory bonding clay, 15-25% finely divided organic burn out material and 5-20% each of finely divided raw kyanite and pyrophyllite, charging a mold with said batch, drying the molded shape and heating it in an oxidizing atmosphere to burn out the organic content and to a firing temperature of approximately 2450° F to 2600° F. to develop dimensional stability.

10. A process of making refractory insulating brick which comprises, forming a molding batch containing about one part water and two parts dry solids comprising approximately 40% finely divided kaolin, 10% each of finely divided kyanite and pyrophyllite, 20% of grog and 20% of sawdust, molding said batch, drying the molded product, and firing it in an oxidizing atmosphere between 2450° F. and 2600° F.

ADAM S. RANKINE, Jr.

REFERENCES CITED

The following references are of record in the file of this patent:

UNITED STATES PATENTS

| Number | Name | Date |
|---|---|---|
| 2,257,380 | Hepner | Sept. 30, 1941 |
| 2,317,855 | Hepner et al. | Apr. 27, 1943 |
| 2,363,522 | Greaves-Walker et al. | Nov. 28, 1944 |